May 7, 1968     W. H. EMERSON     3,381,495
CHANGEABLE ORNAMENT HAVING PIVOTED PLATES

Filed Aug. 5, 1965     3 Sheets-Sheet 1

INVENTOR.
WILLIAM H. EMERSON

May 7, 1968  W. H. EMERSON  3,381,495
CHANGEABLE ORNAMENT HAVING PIVOTED PLATES
Filed Aug. 5, 1965  3 Sheets-Sheet 2

INVENTOR.
WILLIAM H. EMERSON

United States Patent Office 3,381,495
Patented May 7, 1968

3,381,495
CHANGEABLE ORNAMENT HAVING PIVOTED PLATES
William H. Emerson, National City, Calif.
(2212 33rd St., San Diego, Calif. 92104)
Filed Aug. 5, 1965, Ser. No. 477,390
1 Claim. (Cl. 63—2)

ABSTRACT OF THE DISCLOSURE

A convertible emblem having a plurality of plates pivotally attached at one corner thereof and superposed one upon the other and so formed when the plate means are closed they form a framed symbol and when they are spread, they form a series of letters associated in meaning with the symbol.

My invention relates to an emblem and more particularly to an item of jewelry to be worn on the person or displayed elsewhere and consists of a combination of letters that spell a word or initials of a combination of words and that when stacked or laminated one upon the other forms a cross or other symbol with a circle, oval or rectangle about the periphery.

An object of the invention is to provide a device of a symbolic nature that contains letters pinned or hinged together that when laminated form an image of a closed cross or other symbol and that when opened out form letters in combination, spelling a word or initials.

These together with other objects and advantages which will become apparent reside in the details of construction and operation as will be more fully described and claimed, reference being made to the accompanying drawings forming a part hereof, wherein like numerals refer to like parts throughout, and in which:

FIGURE 7 shows plate members connected by pivot means which consists of two pivots at 1, 1. The plates are arranged in superposed relationship forming a closed star, representative of the Lone Star of the State of Texas and FIGURE 8 shows the same device representative of the word TEX when the components are folded out.

Figure 1:
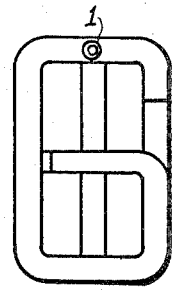
FIGURE 1, is an elevational view of one form of the invention in the closed position and forming a closed cross.
Figure 2:
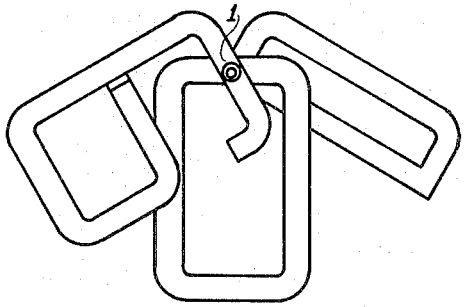
FIGURE 2, is on elevational view of the same form of the invention but fanned out to form the letters spelling the word "GOD."
Figure 3:
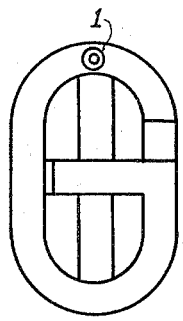
FIGURES 3 and 4, are elevational views of the same general form of the invention but showing the letters radiused more to form a more oval configuration.
Figure 4:
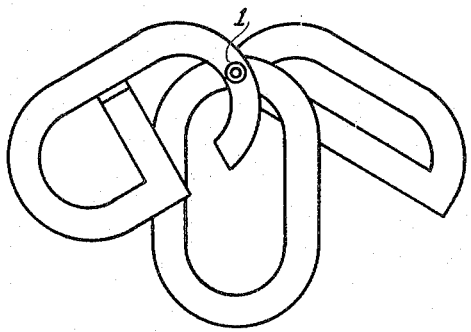
Figure 5:
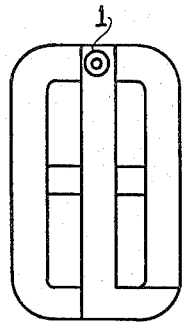
FIGURES 5 and 6, are versions of the same general concept, i.e. forming a closed cross when laminated but spelling the word "LORD" when fanned out as shown in FIGURE 6.
Figure 6:
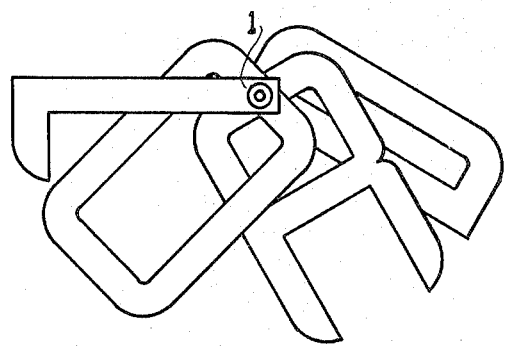
Figure 7:
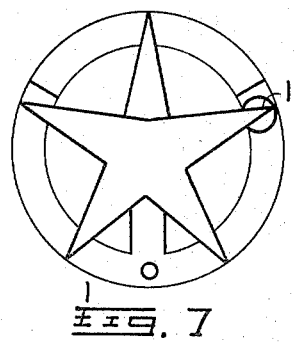
FIGURES 7 and 8, are additional versions of the same general concept.
Figure 8:
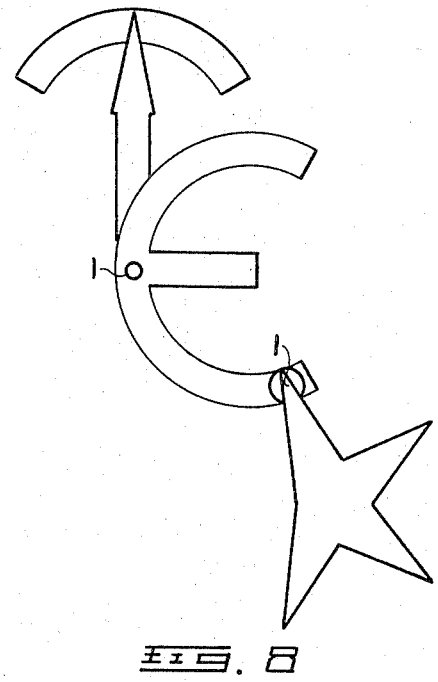

Referring specifically to the drawings, there is provided a plurality of generally rectangular or oval shaped letters of thin metal, plastic, paper or other suitable plate means pivotally attached at the top as by pin or rivet 1, all figures. When closed so that they are superposed, as shown in FIGURES 1, 3, and 5, they form a framed symbol such as a cross as displayed; when extended, they form a series of letters associated in meaning with said symbol.

It is not the intention of the inventor to limit the instant invention to the configurations as shown, but rather to broaden the scope of the instant concept to include any laminated letters or numerals that when placed one upon the other forms a symbol and when fanned or hinged out form a meaningful word or initials and, it will be clear that the embodiment of the invention may be modified or used in many ways as well as changed. Such changes, modifications or uses will not effect the essence of the invention as described in the annexed claim.

I claim:
1. An article of jewelry comprising:
   first, second and third plate means, each of said plate means including at least one plate member;
   pivot means joining said plate members for relative rotation in mutual parallel planes from a superposed position to an extended position;
   said plate means each having the shape of a letter of the alphabet;
   at least two of said plate means having portions jointly forming a shape having the appearance of a framed symbol when all said plate means are in said superposed position; and
   said plate means forming a series of letters associated in meaning with said symbol when in said extended position.

References Cited

UNITED STATES PATENTS

| D. 46,369 | 9/1914 | Ramey. | |
|---|---|---|---|
| 768,120 | 8/1904 | Fisher | 63—18 X |
| 886,172 | 4/1908 | Bevans. | |
| 1,032,257 | 7/1912 | Walrow | 63—23 |
| 2,521,198 | 9/1950 | Adler. | |

FOREIGN PATENTS 3,072   5/1871   Great Britain.

F. BARRY SHAY, *Primary Examiner.*